June 26, 1956 — A. VOORHIES, JR., ET AL — 2,752,288
METHOD OF PRETREATING HYDROFORMING CATALYSTS
Filed June 21, 1952
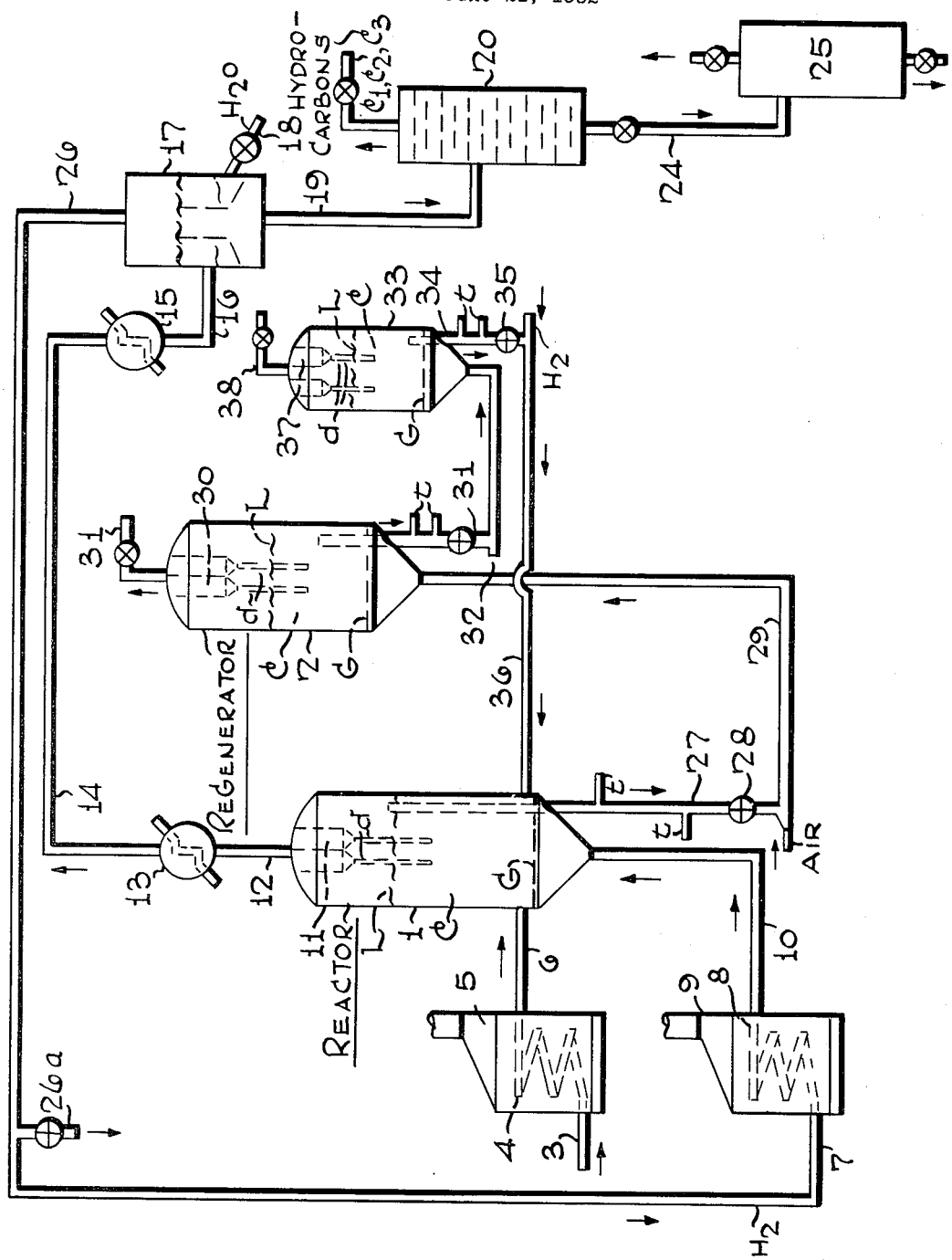
Alexis Voorhies Jr. Inventor
Warren M. Smith
By J. Cashman Attorney

United States Patent Office 2,752,288
Patented June 26, 1956

2,752,288

METHOD OF PRETREATING HYDROFORMING CATALYSTS

Alexis Voorhies, Jr., and Warren M. Smith, Baton Rouge, La., assignors to Esso Research and Engineering Company, a corporation of Delaware Application June 21, 1952, Serial No. 294,842

8 Claims. (Cl. 196—50)

The present invention relates to improvements in the hydroforming of naphthas. More particularly, the present invention relates to treatment of the catalyst following regeneration and just before the catalyst is returned to the reaction zone.

Hydroforming has been defined as an operation conducted at elevated temperatures and pressures in which a naphthene-containing naphtha is contacted with a solid catalytic material in the presence of added hydrogen. The process is so operated that there is no net consumption of hydrogen and, in fact, there is usually a net production of hydrogen. The feed stock is usually a virgin naphtha containing about 15 or more volume per cent of naphthenic naphtha. During the hydroforming operation these naphthenes are dehydrogenated to form the corresponding aromatics. In addition to the naphthene dehydrogenation reactions there occurs some isomerization and also more or less cracking of the paraffin hydrocarbons present in the feed stock, together with some aromatization of these paraffins to form additional quantities of aromatics.

The catalyst employed in the operation of hydroforming comprises any good hydrogenation catalyst, but the oxides of the sixth group metals of the Periodic System, together with platinum and palladium are preferred. These hydrogenation catalysts are preferably carried on a suitable spacing agent or base such as an active form of alumina which may have associated therewith a small amount of silica. This silica serves to increase the heat stability of the alumina so that when it becomes necessary to regenerate the catalyst by burning off carbonaceous deposits formed on the catalyst during the productive phase of the cycle, there is less danger of injuring the catalyst base at the high temperatures to which the catalyst is exposed during the said regeneration. The base may also be a zinc spinel, i. e., $ZnAl_2O_4$.

The present invention has specific application with respect to the hydroforming of naphthas in the process wherein the catalyst in the reaction zone is in the form of a dense fluidized bed. In the system contemplated as adapted to carry out the present process, which consists essentially of a reaction vessel and a regeneration vessel interconnected by transfer lines and between which vessels the catalyst continuously circulates to and fro as the occasion requires, it is necessary and desirable to maintain the system under constant pressure. In the older fixed-bed type of operation, it was entirely feasible to treat the catalyst during the regeneration phase with gasiform material at pressures most favorable for the particular treatment. For example, in fixed-bed operation where the hydroforming step per se was conducted at elevated pressures, say, around 200 pounds per square inch, and following this phase the catalyst was regenerated with air at about the same pressure, it was found that catalyst activity was enhanced and maintained at a high level by treating the regenerated catalyst with hydrogen at atmospheric pressure prior to the return of the catalyst to the on-stream phase. As stated, this is not feasible in the type of operation with which the present invention deals, as will more fully appear hereinafter.

Many otherwise desirable naphtha feed stocks for the hydroforming process contain sulfur. This sulfur poisons the catalyst and in a relatively short period deactivates the catalyst, or at least lowers its activity to an undesirably low level. It is, therefore, imperative that the sulfur-containing bodies which contaminate the catalyst when a high sulfur feed stock is employed must be removed together with the normal carbonaceous deposits during the regeneration of the catalyst to remove the carbonaceous deposits, or at some time before the catalyst is returned to the on-stream process. The present invention proposes methods for accomplishing this result.

The main object of the present invention, therefore, is to modify the fluidized catalyst technique as applied to the hydroforming of sulfur-containing naphthas so that it is adapted to hydroform such feed stocks without substantial injury to the catalyst.

Another object of the present invention is to pretreat the regenerated hydroforming catalyst prior to its return to the on-stream phase with a hydrogen-containing gas at system pressure, but in a manner which will serve to remove harmful sulfur compounds from said catalyst.

Other and further objects of the invention will appear in the following more detailed description and claims.

In the accompanying drawing there is shown diagrammatically the essential elements of an apparatus layout, in which a preferred modification of the invention may be carried into effect.

Referring in detail to the drawing, 1 represents the reaction vessel and 2 represents the vessel in which the fouled catalyst is regenerated. In vessels 1 and 2 there is indicated by reference character C fluidized beds of catalyst, extending in each instance, from a grid G to an upper dense phase level L. Under the influence of controlled gasiform superficial velocities responsive to the particle size distribution of the powdered catalyst, in a manner known to the art, the beds of catalyst in 1 and 2 are maintained in a dense fluidized state.

A virgin naphtha boiling substantially within the range of from about 200°–400° F., enters the present system through line 3, is then forced through a fired coil 4 in a furnace 5 where it is heated to a temperature of from about 875°–1000° F. It should be pointed out that the oil in line 3 has previously been preheated by heat exchange with hot products of the reaction in suitable equipment (not shown). The heated oil is withdrawn from coil 4 through line 6 and then charged into the bed of catalyst C in reactor 1 at a point above the grid G, but in close proximity thereto.

Meanwhile the hydrogen-containing gas from line 7 is forced through a coil 8 disposed in the furnace 9 wherein it is heated to a temperature of from 1000°–1300° F. This hydrogen has a purity of 60 to 75%. The heated hydrogen is withdrawn from coil 8 through line 10 and charged into the bottom of reactor 1, whereupon it passes upwardly through the gas distributing grid G and into the bed of catalyst C.

Under conditions of operation more fully set forth hereinafter, the desired conversion takes place and the raw product emerges from the dense bed of catalyst C and passes in the form of a light suspension into the space between L and the top of the reactor; this latter space is in effect a catalyst disengaging space wherein the gasiform material about to pass out of the reactor is freed from the main bulk of catalyst. However, in order to prevent substantial entrainment of catalyst overhead from the reactor, the gasiform material is forced through one or more "cyclones" 11 wherein catalyst is separated from the vapors and returned to the dense phase C through dip legs *d*. The raw product is withdrawn from the reactor through line 12 and is thence passed through a cooler 13, wherein partial condensation of the normally liquid products occurs. The main purpose of this cooler is to condense heavy polymer in the product and at the same time to wash out of the uncondensed material catalyst still entrained therein. In equipment not shown, this heavy liquefied material (associated with some lighter material) is filtered to recover catalyst, and after that the condensed material is fractionated to separate the heavy polymer which may be returned to the reactor 1 for further processing.

Referring again to cooler 13, the uncondensed material is withdrawn from cooler 13 via line 14 and forced through a water cooler 15 where complete liquefaction of condensible material is effected. The cooled material is withdrawn through line 16 and charged to a separator 17.

As will subsequently appear, water is associated with the hydrocarbon oil in separator 17 and in this relatively quiescent zone two liquid layers are formed, namely, an upper oil layer and a lower water layer. The water layer is withdrawn through line 18, while the oil layer is wthdrawn through drawoff pipe 19 and charged to a finishing still 20. In finishing still 20 light hydrocarbons, say, $C_1$-$C_3$ hydrocarbons, are withdrawn overhead while the desired hydroformate is withdrawn through line 24 and collected in receiving drum 25.

Referring again to separator 17, a hydrogen-containing gas is withdrawn overhead through line 26 and recycled to line 7 for further use in the process.

As previously pointed out, the catalyst during the operations described in reactor 1 becomes associated with carbonaceous deposits and sulfur bodies. To remove these contaminating deposits, catalyst is withdrawn through a standpipe 27 controlled by a valve 28. In order to dislodge adsorbed or occluded hydrocarbons, gas is injected through taps *t* into standpipe 27. This gas may be steam. The mixture of steam and volatile hydrocarbons is withdrawn from the top of standpipe 27 at a point above the upper dense phase level L and are intermixed with the product about to issue from the reactor.

The stripped catalyst is then charged into line 29 which contains air. The stripped catalyst forms a suspension in line 29 and in this form is carried into regenerator 2. Under conditions more fully set forth hereinafter, the carbonaceous contaminants of the catalyst are removed by burning and the fumes are withdrawn from the fluidized bed of catalyst C, passed through a light phase disengaging space located between L and the top of the regenerator, thence are forced through "cyclones" 30 wherein catalyst is separated and returned through dip legs *d* to the bed of catalyst C. The regeneration fumes are withdrawn from the reactor through line 31. Hot catalyst is withdrawn from the regenerator 2 through a standpipe 31 carrying the usual fluidizing gas taps *t* and charged to a line 32 containing hydrogen diluted with an inert gas such as nitrogen or steam. The suspension of catalyst in gasiform material is passed into a pretreater 33 wherein, as in the case of vessels 1 and 2, it is again formed into a dense fluidized bed C. The atmosphere in 33, while existing at the same total pressure approximately as that in vessels 1 and 2, has a hydrogen partial pressure, due to the dilution, such that it were as though the catalyst were hydrogen-treated at atmospheric pressure or thereabout. This hydrogen treatment is conducted at a temperature of 900°–1000° F. for a period of about 15 minutes, and thereafter the catalyst is withdrawn through a standpipe 34, controlled by valve 35, charged to a portion of recycled hydrogen which is withdrawn from line 26 by line 26A and introduced to line 36 at point A, wherein it forms a suspension and in this form is returned to reactor 1 via line 36. As usual, standpipe 34 is provided with gas taps *t*. When steam is used as the hydrogen diluent gas in pretreating vessel 33, small quantities of nitrogen may be added to standpipe 34 in order to remove steam associated with the catalyst and thereby minimize the transfer of steam into the reactor 1.

The treating gas in treater 33 passes frob bed C through a light phase which functions as a catalyst disengaging space, thence passes through "cyclones" 37 wherein entrained catalyst is separated and returned to bed C via dip pipes *d*, the treating gas eventually passing out of the treater 33 through line 38.

In order to describe the invention more fully, the following specific example is set forth:

EXAMPLE

*Conditions in Reactor 1*

|  | Preferred Range | Broad Range |
|---|---|---|
| Temperature, ° F | 900–950 | 850–1,600 |
| Pressure, p. s. i. | 50–250 | 10–500 |
| Catalyst to Oil Ratio | 0. 5–2 | 0. 2–10 |
| Contact Time, hours | 0. 5–10 | 0. 1–25 |

*Conditions in Regenerator 2*

|  | Preferred Range | Broad Range |
|---|---|---|
| Temperature, ° F | 1,000–1,200 | 1,000–1,200 |
| Pressure, p. s. i. | 50–250 | 10–500 |
| Contact Time, Hours | 0. 05–1 | 0. 01–2. 5 |

*Conditions in Treater 33*

|  | Preferred Range | Broad Range |
|---|---|---|
| Treating Gas: | | |
| Percent $H_2$ | 2–30 | 1–100 |
| Percent Diluent Gas | 98–70 | 99–0 |
| Temperature, ° F | 900–1,000 | 900–1,200 |
| Pressure (Total), p. s. i. | 50–250 | 10–500 |
| $H_2$ Partial Pressure, p. s. i. | 5–15 | 5–15 |
| Length in Minutes of Treat, minutes | 5–15 | 1–60 |

It will be understood that the foregoing example is merely illustrative and does not impose any limitations on the present invention.

As previously indicated, the catalysts suitable in carrying out the present invention are alumina or zinc alumina spinel supported hydrogenation catalysts, broadly speaking. However, preferred catalysts consist of the sixth group metal oxides carried on active alumina or zinc alumina spinel. For instance, a satisfactory catalyst is one containing from 5 to 20 weight per cent $MoO_3$ carried on active alumina or zinc alumina spinel.

To recapitulate briefly, in hydroforming a sulfur containing naphtha, sulfur is liberated during the reforming phase of the process and is retained on a molybdena-alumina catalyst as molybdenum sulfide. It has been found in fixed catalyst bed work that when such a sulfur containing catalyst is subsequently regenerated with air, the sulfur is converted to the oxide form and is removed from the catalyst partly in the regeneration period itself and partly during the subsequent catalyst pretreatment during which the catalyst is pretreated at atmospheric pressure with hydrogen.

It has now been found in a fluidized catalyst hydroforming pilot plant that if the pretreatment of a regenerated catalyst is carried out under operating pressures (200 pounds), the sulfur is not liberated during the normal hydrogen treatment but remains on the catalyst with the attendant result that the catalyst is brought to a lower order of activity. During the treatment with the hydrogen probably molybdenum is associated with $SO_3$ and/or $SO_2$ formed during the regeneration of the catalyst with air, and these sulfur bodies are reduced by the hydrogen treatment and combined with the molybdenum to form the sulfide. Since the sulfide form of a molybdenum-alumina catalyst is less active for hydroforming than the oxide form, a loss of catalyst activity occurs. Although the fluid hydroforming process is still operable under these conditions, lower feed rates must be used in order to obtain a given quality of product. In continuous fluidized catalyst operation such as herein described, it is not practical to maintain catalyst activity as in conventional fixed-bed hydroforming by depressuring the unit during the hydrogen treatment, following regeneration of the catalyst with an oxygen-containing gas in order to remove sulfur compounds from the catalyst since the stream of fluidized catalyst is not amenable to recompression by conventional means. Rather, the present invention proposes that the catalyst withdrawn from the regenerator be treated at operating pressure with hydrogen admixed with a gas to the extent that the partial pressure of the hydrogen is sufficiently low that a substantial portion of the sulfur remaining on the catalyst is removed during this hydrogen treatment step and consequently catalyst deactivation by sulfur poisoning is materially reduced.

Numerous modifications of the present invention will be apparent to those who are familiar with this art without departing from the spirit thereof.

What is claimed is:

1. In the hydroforming of virgin naphthas containing sulfur in a continuous operation wherein a hydroforming catalyst, comprising molybdenum oxide carried on one of the class consisting of active alumina and zinc alumina spinel, in powdered form is maintained in the form of a fluidized bed in a reaction zone and also in a regeneration zone, between which zones the catalyst circulates as it is required to be withdrawn from the reaction zone, regenerated and returned to said reaction zone, further characterized in that both zones are maintained at super atmospheric pressure, and wherein, further, the catalyst acquires sulfur bodies as well as carbonaceous deposits during the reaction period, the improvement which comprises removing sulfur bodies from the regenerated catalyst by treating said regenerated catalyst with a gasiform material, in the form of a dense fluidized bed in a pretreating zone for a period of from about 1-60 minutes, at a pressure of the same order as to that existing in the reaction zone and the regeneration zone, said gasiform material containing free hydrogen existing at a partial pressure sufficiently low so as to cause removal of sulfur bodies from the said regenerated catalyst.

2. The method set forth in claim 1 in which the regenerated catalyst is treated with a gas containing free hydrogen, the partial pressure of which in said gas is from 5 to 15 p. s. i.

3. The method set forth in claim 1 in which the hydrogen-containing gas used for treating the regenerated catalyst consists of a major proportion of steam and a minor proportion of free hydrogen.

4. The method set forth in claim 1 in which the regenerated catalyst is treated with a gas which consists of a major proportion of nitrogen and a minor proportion of hydrogen.

5. The method of pretreating a hot regenerated sulfur-containing hydroforming catalyst, comprising molybdenum oxide supported on one of the class consisting of active alumina and zinc alumina spinel, which catalyst is employed in a system wherein the catalyst passes continually from a hydroforming zone to a regeneration zone and wherein the system operates under a pressure of from about 10-500 p. s. i., the improvement which comprises pretreating the catalyst following regeneration and before return to the reaction zone, which comprises contacting the said catalyst, while in the form of a dense fluidized mass for a period of from about 1-60 minutes, with a treating gas at a pressure of the same order as that prevailing in the said hydroforming zone and the said regeneration zone with the said pretreating gas containing free hydrogen under a partial pressure of from about 5-15 p. s. i.

6. The method of pretreating a hot regenerated sulfur-containing hydroforming catalyst comprising molybdenum oxide supported on one of the class consisting of active alumina and zinc alumina spinel, which catalyst is employed in a system wherein the catalyst passes continually from a hydroforming zone to a regeneration zone and wherein the system operates under a pressure of from about 50-250 p. s. i., the improvement which comprises pretreating the catalyst following regeneration and before return to the reaction zone, which comprises contacting the said catalyst, while in the form of a dense fluidized mass for a period of from about 1-60 minutes, with a treating gas at a pressure of the same order as that prevailing in the said hydroforming zone and the said regeneration zone with the said pretreating gas containing free hydrogen under a partial pressure of from about 5-15 p. s. i.

7. The method set forth in claim 5 in which the pretreatment of the catalyst is conducted for a period of from about 5-15 minutes.

8. The method set forth in claim 5 in which the pretreatment of the catalyst is carried out at a temperature of from about 900°–1200° F.

References Cited in the file of this patent

UNITED STATES PATENTS

| | | |
|---|---|---|
| 2,304,183 | Layng et al. | Dec. 8, 1942 |
| 2,366,372 | Voorhees | Jan. 2, 1945 |
| 2,386,050 | Holder | Oct. 2, 1945 |
| 2,425,754 | Murphree | Aug. 17, 1947 |
| 2,455,419 | Johnson | Dec. 7, 1948 |
| 2,472,844 | Munday et al. | June 14, 1949 |
| 2,547,221 | Layng | Apr. 3, 1951 |
| 2,646,388 | Crawford | July 21, 1953 |

OTHER REFERENCES

Weber: "The Oil and Gas Journal," vol. 50, No. 6, pp. 53–54, June 14, 1951.